Patented Sept. 15, 1942

2,295,735

UNITED STATES PATENT OFFICE 2,295,735

METHOD OF MAKING RUBBER DESIGNS

Victor H. Hurt, Cranston, R. I., assignor to United States Rubber Company, New York, N. Y., a corporation of New Jersey No Drawing. Application October 24, 1939, Serial No. 301,019

8 Claims. (Cl. 41—24)

This invention relates to a method of making rubber designs, and more particularly to the manufacture of rubber designs from latex.

Rubber designs have been made by spreading latex on a suitably engraved plate, removing the latex from the relief parts of the plate by flowing or by the application of a squeegee, drying the latex, and removing the thus formed rubber design from the plate. The engraving of these plates is expensive and they must be kept in use in the process until the rubber design is completed and removed from the plate. It has been suggested to coagulate latex in a desired design by first applying a coagulant to a suitable base in the desired design, as by printing it thereon, or spraying through a stencil, after which the base may be immersed in latex, and after a short time removed and the uncoagulated latex washed off leaving the coagulated rubber design on the base. The washing of the excess latex from the base is a cumbersome operation and necessitates the discarding of valuable unused material.

According to the present invention, latex is coagulated in the desired raised design on a base without the necessity for washing uncoagulated latex from the surface and consequently without loss of the valuable latex. I have discovered that if latex is applied to the surface of a base, the subsequent application of a coagulant in the desired design on the latex film will coagulate the latex in the desired design and also cause the rubber particles in the interstices between the outline of the design to migrate to the coagulant and form a raised design of coagulum on the base which may be dried in the desired manner. If the interstices between the design are sufficiently small, there will be substantially no uncoagulated latex left on the base between the interstices of the design. The design may possess any desired outline, simple or complex, and may include numbers and lettering, or it may be purely decorative.

In carrying out the present invention, a film coating of latex is applied to the surface of a base by a spreading, spraying, dipping or the like operation, after which a coagulant in the desired design is applied to the latex coating and allowed to remain in contact with the coating until the desired thickness of latex has coagulated in the configuration of the design, after which the coagulum may be dried. The base may be a temporary or transfer backing whereupon the coagulated rubber in the desired design may be removed from the base, with or without partial or complete drying, and, if desired, be secured by vulcanization or by an adhesive to a rubber or other surface of which it is to become a permanent part. The base, or its surface, may be of rubber or other material to which dried latex coagulum will adhere, and in such case, the drying of the coagulum on the base will form a raised rubber face in the desired design on the rubber or other surface of the base. The rubber design may be formed according to the present invention on the surface of a rubber sheet for the manufacture of decorative rubber sheetings or for the manufacture of rubber labels which may be cut out and affixed to rubber articles in a known manner. The rubber design may be formed on a perforate rubber sheet, for example, one containing upwards of 1000 minute perforations per square inch made as described in the Linscott et al. Patent No. 2,032,941 to give a laminated sheet material especially suitable for bathing suit manufacture.

The coagulant may be applied in a predetermined design to the latex coating in various ways, it being necessary only to maintain the coagulant in the desired design in contact with the latex until the desired thickness of coagulum has been built up in the configuration of the design or until substantially all the rubber particles in the latex coating in the interstices between the outline of the design as well as the rubber particles in contact with the design matrix have become coagulated in the configuration of the design. The coagulant may be applied to the latex coating by printing the coagulant on the latex coating by means of a roller, or other printing or stamping device having relief portions in the desired design. An open mesh fabric such as a lace or net fabric may be impregnated with a coagulant and then be made to contact the latex coating on the backing until the latex has coagulated in the outline of the fabric. In this simple manner, the coagulant may be applied to the latex coating in an open mesh fabric design to produce a perforate rubber sheeting, or a raised configuration or ply in the outline of the fabric. The coagulant may be a liquid coagulant such as acetic, formic, hydrochloric or other acid, or it may be a solution of a salt of a polyvalent metal. Preferably, the coagulant is a solid material such as a salt of a polyvalent metal, dried from a solution of the same in the interstices of the fabric or on the relief portions of the roller or other printing or stamping device used to apply the coagulant in the desired design on the latex coating. If the coagulant is a liquid, the time in which the coagulant-applying device remains in contact with the latex coating need be only of substantially momentary duration since the mere contact of the device with the latex will cause the liquid coagulant to be transferred from the relief parts of the device to the latex coating. On the other hand, when a dry coagulant is used, momentary contact of the coagulant-applying device with the latex may not remove the coagulant and the device should be kept in contact with the latex coating until sufficient rubber particles in the latex coating have become coagulated to give the desired thickness of the raised design, or until the aqueous medium of the latex has dissolved sufficient coagulant to coagulate the rubber particles in the latex coating in the desired thickness of the outline of the design or until all the rubber particles in the interstices between the outline of the design have migrated to the coagulant in the design outline.

As a specific example, in practice, an open mesh fabric, such as a lace or net fabric, which has been immersed in a solution of a coagulant salt, for example, magnesium acetate, and dried, will in a few seconds' contact with the latex coating transfer sufficient coagulant to the latex coating to coagulate the latex in the raised design of the fabric. Thus, in a continuous process, the coagulant treated fabric contacts the surface or belt on which latex is coated for only a short distance of its travel, usually for only a few feet, at the end of which contact either the latex has already coagulated sufficiently in the design of the fabric to give the desired thickness of design, or sufficient coagulant has dissolved in the latex to complete the coagulation of the latex to the desired extent within the operating cycle. The use of a dry coagulant as by saturating and drying a fabric is favored as it permits repeated or continued use of the same coagulant-applying device before it is necessary to replenish the coagulant. Further, the use of a dry coagulant tends to give sharper outlines in the final rubber design.

The term "latex" in the description and claims is used to designate broadly coagulable aqueous dispersions of elastic materials, including artificial dispersions of rubber or rubber-like materials as well as natural latex, which may be preserved or compounded or otherwise treated as desired as by vulcanization and which may be in a normal, diluted, concentrated or purified condition produced by methods well known in the art.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method which comprises applying a coating of latex on the surface of a base, applying a coagulant to said latex coating in a predetermined design and allowing said coagulant to remain in contact with said latex until the desired thickness of latex has become coagulated in the configuration of the design.

2. The method which comprises applying a coating of latex on a rubber surface, applying a coagulant to said latex coating in a predetermined design and allowing said coagulant to remain in contact with said latex until the desired thickness of latex has become coagulated in the configuration of the design.

3. The method which comprises applying a coating of latex on the surface of a base, applying to said latex coating an open mesh fabric impregnated with a coagulant and allowing the coagulant to remain in contact with said latex until the desired thickness of latex has become coagulated in the configuration of the fabric, and removing the fabric from contact with said latex coating.

4. The method which comprises applying a coating of latex on a rubber surface, applying to said latex coating an open mesh fabric impregnated with a coagulant and allowing the coagulant to remain in contact with said latex until the desired thickness of latex has become coagulated in the configuration of the fabric, removing the fabric from contact with said latex coating, and drying to form a raised rubber face in the design of the fabric on said rubber surface.

5. The method which comprises applying a coating of latex on the surface of a base, applying a coagulant to said latex coating in a predetermined design and allowing said coagulant to remain in contact with said latex until substantially all the rubber particles in the latex coating in the interstices between the outline of the design have become coagulated in the configuration of the design.

6. The method which comprises applying a coating of latex on a rubber surface, applying a coagulant to said latex coating in a predetermined design and allowing said coagulant to remain in contact with said latex until substantially all the rubber particles in the latex coating in the interstices between the outline of the design have become coagulated in the configuration of the design.

7. The method which comprises applying a coating of latex on the surface of a base, applying to said latex coating an open mesh fabric impregnated with a coagulant and allowing the coagulant to remain in contact with said latex until substantially all the rubber particles in the latex coating in the interstices between the outline of the fabric have become coagulated in the configuration of the fabric, and removing the fabric from contact with said latex coating.

8. The method which comprises applying a coating of latex on a rubber surface, applying to said latex coating an open mesh fabric impregnated with a coagulant and allowing the coagulant to remain in contact with said latex until substantially all the rubber particles in the latex coating in the interstices between the outline of the fabric have become coagulated in the configuration of the fabric, removing the fabric from contact with said latex coating, and drying to form a raised rubber face in the design of the fabric on said rubber surface.

VICTOR H. HURT.